United States Patent
Poornachandran et al.

(10) Patent No.: US 11,209,815 B2
(45) Date of Patent: Dec. 28, 2021

(54) DRONE CONTROL REGISTRATION

(71) Applicant: Intel Corporation, Santa Clara, CA (US)

(72) Inventors: Rajesh Poornachandran, Portland, OR (US); Ned M. Smith, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1065 days.

(21) Appl. No.: 15/088,949

(22) Filed: Apr. 1, 2016

(65) Prior Publication Data

US 2017/0285633 A1    Oct. 5, 2017

(51) Int. Cl.
*G05D 1/00* (2006.01)
*G08G 5/00* (2006.01)
*B64C 39/02* (2006.01)
*H04W 60/00* (2009.01)

(52) U.S. Cl.
CPC ......... *G05D 1/0022* (2013.01); *B64C 39/024* (2013.01); *G08G 5/0069* (2013.01); *B64C 2201/141* (2013.01); *H04W 60/00* (2013.01)

(58) Field of Classification Search
CPC ............. G05D 1/0022; B64C 39/024; B64C 2201/141; G08G 5/0069; H04W 60/00
See application file for complete search history.

(56) References Cited

U.S. PATENT DOCUMENTS

2017/0278410 A1* 9/2017 Byers .................. B64C 39/024

FOREIGN PATENT DOCUMENTS

CN    105261189 A  *  1/2016

OTHER PUBLICATIONS

Wikipedia, "Block Chain (Database)", From Wikipedia, the free encyclopedia, retrieved from web on Mar. 13, 2016, 5 pages.
Business Insider, "The Drones Report: Market forecasts, regulatory barriers, top vendors, and leading commercial applications", May 27, 2015, 4 pages.
Goglia, John, "FAA Finally Admits Names And Home Addresses in Drone Registry will be Publicaly Available", Forbes, Logistics & Transportation,The Little Black Book of Billionaire Secrets, Dec. 18, 2015, 8 pages.

(Continued)

*Primary Examiner* — Kelly D Williams
(74) *Attorney, Agent, or Firm* — Jaffery Watson Mendonsa & Hamilton LLP

(57) ABSTRACT

A drone includes technology for tracking controllers. A controller registration module (CRM) in the drone enables the drone to receive a first controller identifier from a first remote device. In response to receiving the first controller identifier, the CRM registers the first remote device as the current controller for the drone. Registering comprises adding the first controller identifier to a drone control registration record (DCRR) in the drone. Also, the DCRR is added to a block chain in remote storage. The CRM then receives a second controller identifier from a second remote device. In response, the CRM registers the second remote device as the current controller. Registering comprises creating an updated DCRR that identifies the second controller as the current controller. The updated DCRR is then added to the block chain. Other embodiments are described and claimed.

18 Claims, 5 Drawing Sheets

(56) References Cited

OTHER PUBLICATIONS

GlobalPlatform, "Guides: GlobalPlatform made simple guide: Trusted Execution Environment (TEE) Guide", retrieved on Mar. 30, 2016, 5 pages. Retrieved from: http://www.globalplatform.org/mediaguidetee.asp.

Albright, Dann, "How Do Satellite Phones Work, And Where Can You Buy One", Jan. 23, 2015, 1 page.

Koebler, Jason, "How NASA Plans to Open 'Air Highways' for Drones | Motherboard", Sep. 9, 2014, 9 pages. Retrieved from: http://motherboard.vice.com/read/how-nasa-plans-to-open-air-highways-for-drones.

Wikipedia, "Intel RealSense", From Wikipedia, the free encyclopedia, retrieved from web on Mar. 13, 2016, 4 pages.

Cole, Bernard, "Intel to Plug Security Hole Between Cloud & Devices", EE Times, Sep. 9, 2015, 4 pages. Retrieved from: http://www.eetimes.com/document.asp?doc_id=1327640.

Intel, "Atmel and Microchip Adopt Intel Identity technology for IoT", Intel News Fact Sheet, Aug. 18, 2015, 2 pages.

Intel "Intel® Integrated Performance Primitives (Intel® IPP)", Intel® Developer Zone, retrieved from web on Mar. 13, 2016, 3 pages.

MIT UAV, "MIT UAV Team", 2016, retrieved from web on Mar. 13, 2016, 2 pages.

McNeal, Gregory S., "New Software Allows Fleets of Drones to be Controlled by The Cloud", Forbes, The Little Black Book of Billionaire Secrets, Dec. 15, 2014, 5 pages.

Wikipedia, "OpenCV", From Wikipedia, the free encyclopedia, retrieved from web on Mar. 13, 2016, 4 pages.

Gibbs, Mark, "PixiePath to offer cloud platform for drone flight control", First Look, Network World, Dec. 13, 2014, 4 pages.

Wikipedia, "QR code", From Wikipedia, the free encyclopedia, retrieved from web on Mar. 13, 2016, 15 pages.

Wikipedia "Satellite phone", From Wikipedia, the free encyclopedia, retrieved from web on Mar. 16, 2016, 7 pages.

Smith et al., "Drone Sourced Content Authoring Using Swarm Attestation", U.S. Appl. No. 14/863,918, filed Sep. 24, 2015, 48 pages.

Smith et al., "System, Apparatus And Method For Transferring Ownership Of A Device From Manufacturer To User Using An Embedded Resource", U.S. Appl. No. 62/172,900, filed Jun. 9, 2015, 19 pages.

Smith et al., "System, Apparatus and Method for Transferring Ownership of a Device from Manufacturer to User Using an Embedded Resource", U.S. Appl. No. 14/865,198, filed Sep. 25, 2015, 47 pages.

Poornachandran et al., "System, Apparatus And Method For Transferring Ownership Of A Smart Delivery Package", U.S. Appl. No. 14/977,753, filed Dec. 22, 2015, 42 pages.

Poornachandran et al., "Reverse DRM Geo-Fencing of UAV Method And Apparatus", U.S. Appl. No. 15/063,210, filed Mar. 7, 2016, 43 pages.

* cited by examiner

DRONE CONTROL REGISTRATION

TECHNICAL FIELD

This disclosure pertains in general to security for data processing systems, and in particular to methods and apparatuses for drone control registration.

BACKGROUND

An unmanned aerial vehicle (UAV) may also be referred to as a drone. A drone may include various sensors and multiple motors for propelling the drone, along with a flight control subsystem or flight control module (FCM) for controlling the motors and sensors in response to control signals received from a remotely operated flight control transmitter (FCT). One of the sensors may be a camera, for instance, and the drone may include a video transmitter (VTX) to provide for first-person-view (FPV) flying.

People typically use FCTs to fly drones via remote control. However, an FCM may also provide for a certain amount of autonomous operation.

One of the challenges of operating a traditional drone is the limited range of a traditional FCT. A VTX may also have limited range. Although a range of twenty or thirty miles may be possible with 433 megahertz (MHz) and 869 MHz bands for control, and with specialized directional high-gain antennas for video transmission, a practical operating range of much less than twenty miles is more typical.

There are many potential commercial uses for drones, but those applications may require greater ranges than are provided by traditional drones and FCTs. Commercial applications may also require greater autonomy of control than is provided by traditional drones. For example, if a person or business wanted to use drones to implement an effective package delivery system in a metropolitan area, the drones might need a range of over 100 miles, and hundreds or thousands of drones might be needed. In addition, those drones might require FCMs that provide for autonomous operations. Additionally, a single drone operator or pilot might need to control multiple drones simultaneously, at least for some of the total flight time.

The present disclosure introduces methods and apparatuses for drone control registration. As described in greater detail below, drone control registration may be used to securely increase the effective range of a drone. Drone control registration may additionally or alternatively provide for various other benefits, as described in greater detail below.

DESCRIPTION OF EMBODIMENTS

Figure 1:
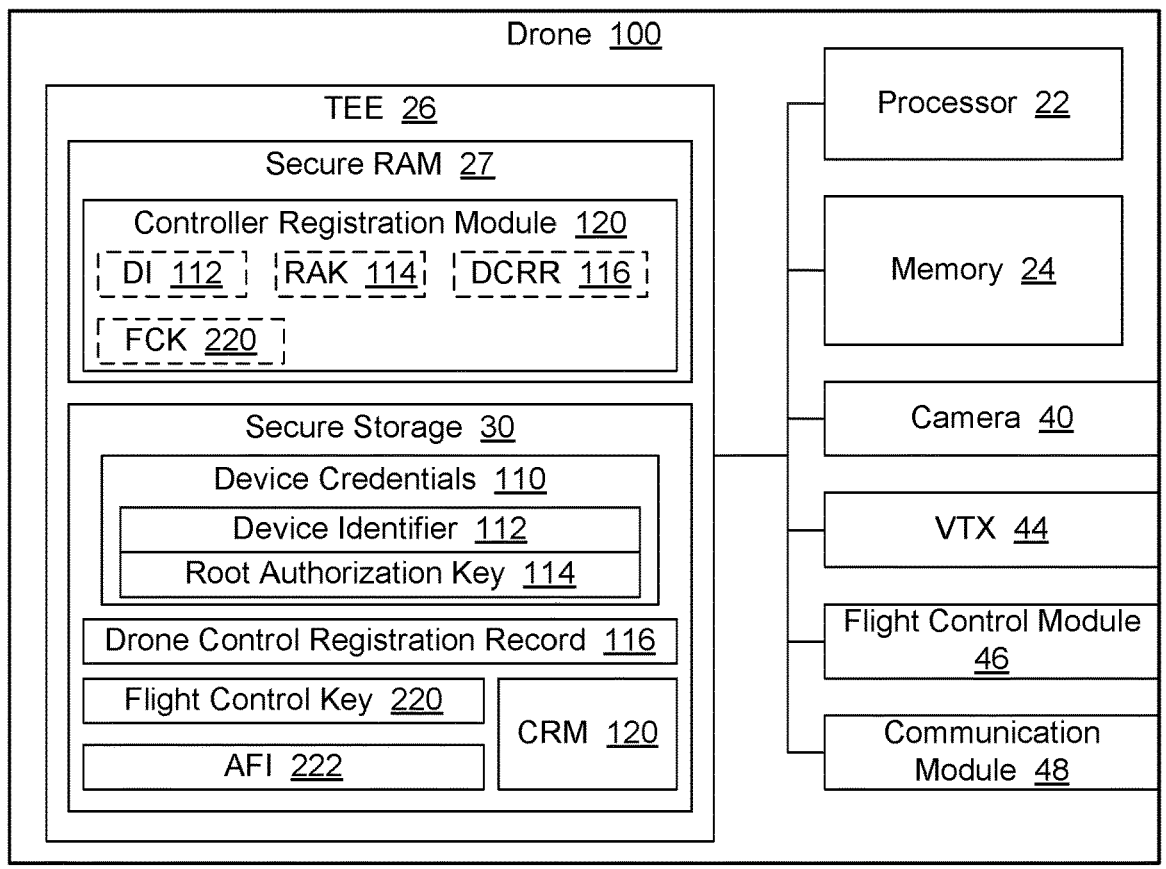
FIG. 1 is a block diagram of a first example embodiment of a drone management system 10.
Figure 1:
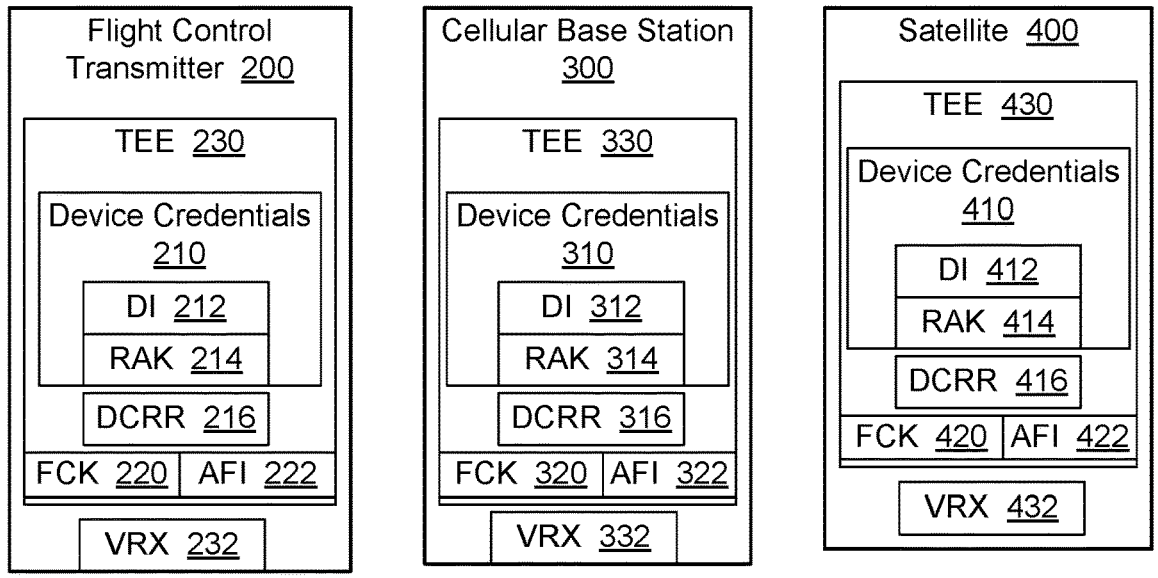
Figure 1:
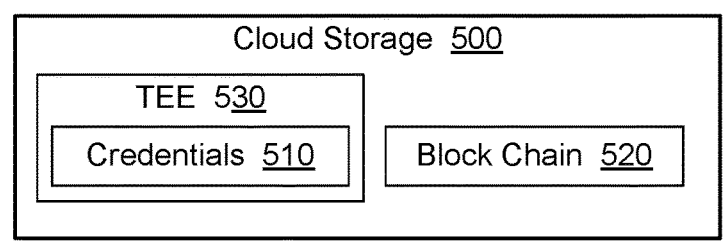

As indicated above, a human operator may use an FCT to control a drone. For instance, an FCT may include (a) joysticks and other input mechanisms (or "flight controls") that can be manipulated by the operator, along with (b) electronics for translating the operator input into electrical signals, and (c) a radio frequency transmitter for sending the flight instructions to the drone, based on the electrical signals from the flight controls. Accordingly, an FCT may also be referred to as a radio control (RC) transmitter. As described in greater detail below, drones may also receive flight instructions from other types of transmitters. For instance, a drone may receive flight instructions from a cellular base station (CBS) or a satellite. A CBS may provide for any suitable type or types of mobile communications, including without limitation third generation (3G), fourth generation (4G), and long term evolution (LTE) mobile communications. However, for purposes of this disclosure, any device that sends flight instructions to a drone may be referred to as a drone controller. Also, for purposes of this disclosure, the term "flight instructions" includes (a) dynamic flight instructions (DFI), such as instructions to control motors in drone 100 in response to operator manipulation of controls on FCT 200, as well as (b) autonomous flight instructions (AFI), such as flight control policies, waypoints, definitions of no-fly zones, etc. In addition, flight instructions may include signals for controlling sensors of the drone.

As indicated above, a commercial application for drones may require the coordination of many drones and many drone controllers. For purposes of this disclosure, a group of one or more drones and one or more other devices that cooperate to control drone operation may be referred to collectively as a drone flight control system or a drone management system. The present disclosure presents multiple embodiments of data processing systems that may be used as parts of a drone management system.

Many different types of entities may be involved with the successful operation of a drone management system. For purposes of this disclosure, the term "manufacturer" refers to the entity (or entities) which is responsible for manufacturing any of the devices. The term "proprietor" refers to the entity that is generally in charge of the drone management system. For instance, the proprietor of a drone management system may be a company that uses the drones to provide delivery services. Accordingly, the proprietor may be responsible for initially provisioning the drones. And the proprietor may subsequently be billed for recharging services used by the drones, as indicated below.

The terms "controller" and "drone controller" refer to a device that is capable of sending flight instructions to a drone. The "owner" of a drone refers to the controller that is currently authorized to control the drone. The terms "operator" and "pilot" refer to a human who provides input to serve as a basis for flight instructions for controlling a drone.

On Dec. 15, 2014, Forbes magazine published an article entitled "New Software Allows Fleets Of Drones To Be Controlled By The Cloud." That article refers a software system with the name or trademark of "PixiePath." According to that article, the PixiePath software system "allows fleets of drones to communicate with the cloud to efficiently execute workloads." The article goes on to state that "the drone, through a 4G uplink, receives tasks and flight plans from the cloud and also uploads data to the cloud."

Nevertheless, conventional drone management systems may lack one, some, or all of the following capabilities:
  use of cellular (e.g., LTE) infrastructure for done flight control with secure roaming between towers and controllers in the network;

allowing multiple drone controllers (e.g., CBSs) to control the drone in a hop-by-hop fashion from one controller to another;

use of communication satellites as "control towers" or "control stations" to facilitate control communication and video telemetry communication in regions lacking terrestrial control towers;

secure mechanisms to provision and/or track drones on an as-needed basis, for both tethered and autonomous flight management;

remote and secure tracking and allocation of resources for drones (e.g., allowing a remote drone to authenticate to a charging base, to receive charging services from the charging base in a metered fashion);

secure tracking of roaming "handoff" changes;

use of contextual sensing (such as the three-dimensional (3D) sensing technology provided by Intel Corporation under the name or trademark "Intel RealSense technology") for navigational assistance.

As described in greater detail below, drone management systems according to the present disclosure may provide one, some, or all of those features and others.

For instance, each drone and each drone controller in a drone management system may contain one or more keys and/or other device credentials, and the devices may use those keys for attestation and to protect the integrity of shared data. Each device may also contain a drone control registration record (DCRR), and the drone management system may use those DCRRs to securely manage and track transitions of control between drone controllers. The drone management system may also use a block chain to record DCRR activity in the cloud. These and other features are described in greater detail below.

FIG. 1 is a block diagram of a first example embodiment of a drone management system 10. In the embodiment of FIG. 1, drone management system 10 includes a drone 100, cloud storage 500, and a number of drone controllers or potential drone controllers, including an FCT 200, a CBS 300, and a satellite 400. For purposes of this disclosure, storage resources, processing resources, and other data processing resource that can be accessed remotely via the Internet may be referred to collectively as the cloud. Accordingly, cloud storage 500 is storage that can be accessed remotely via the Internet.

Drone 100 may include various processing resources, in addition to mechanical features such as a chassis, motors, propellers, and such. Those processing resources may include one or more processors 22 in communication with components such as main memory 24, a trusted execution environment (TEE) 26, a VTX 44, an FCM 46, and a communication module 48. Memory 24 may be implemented as random access memory (RAM) or as non-volatile flash memory, for example. Processor 22 may also communicate with various sensors, such as a camera 40, an altimeter, a compass, a global positioning system (GPS) module, etc.

TEE 26 may provide an isolated execution environment, providing security features such as isolated execution, integrity of trusted applications, and confidentiality of data used by those applications. Further details on the features of a TEE may be found in the article by the GlobalPlatform association entitled "GlobalPlatform made simple guide: Trusted Execution Environment (TEE) Guide" ("The TEE Guide"). For instance, the TEE Guide (which is currently available at www.globalplatform.org/mediaguidetee.asp) explains as follows:

The TEE is a secure area of the main processor in a [device]. It ensures that sensitive data is stored, processed and protected in an isolated, trusted environment. The TEE's ability to offer isolated safe execution of authorized security software, known as 'trusted applications', enables it to provide end-to-end security by enforcing protected execution of authenticated code, confidentiality, authenticity, privacy, system integrity and data access rights. Comparative to other security environments on the device, the TEE also offers high processing speeds and a large amount of accessible memory.

The TEE offers a level of protection against attacks that have been generated in the Rich OS environment. It assists in the control of access rights and houses sensitive applications, which need to be isolated from the Rich OS. For example, the TEE is the ideal environment for content providers offering a video for a limited period of time, as premium content (e.g. HD video) must be secured so that it cannot be shared for free . . . .

In addition, with regard to the security infrastructure of a data processing system or device, the TEE Guide describes a framework with the following three environments. One of those environments is the TEE. The other two are described as follows:

Rich OS: An environment created for versatility and richness where device applications . . . are executed. It is open to third party download after the device is manufactured. Security is a concern here but is secondary to other issues.

[Secure Element (SE)]: The SE is a secure component which comprises autonomous, tamper-resistant hardware within which secure applications and their confidential cryptographic data (e.g. key management) are stored and executed. It allows high levels of security, but limited functionality, and can work in tandem with the TEE. The SE is used for hosting proximity payment applications or official electronic signatures where the highest level of security is required. The TEE can be used to filter access to applications stored directly on the SE to act as a buffer for Malware attacks.

Any suitable approach may be used to implement the security and safety aspects described herein.

In the embodiment of FIG. 1, TEE 26 is implemented as an isolated processing core that also contains protected storage, along with control logic that ensures the integrity of software executing in the TEE. The protected storage may include volatile memory such as secure RAM 27 (which may be implemented as static RAM (SRAM), for instance) and nonvolatile or persistent memory such as secure storage 30. TEE 26 protects the data in the protected storage from being accessed by any software or other components outside of TEE 26, including software operating at the operating system (OS) level. TEE 26 may also prevent software in TEE 26 from affecting components outside of TEE 26. Thus, TEE 26 may be considered a service processor or a security coprocessor.

Among other functions, TEE 26 may serve as a trusted platform module (TPM). Accordingly, drone 100 may store sensitive data or "secrets" (e.g., keys and credentials) in the protected storage of TEE 26. For instance, drone 100 may store device credentials 110 and a DCRR 116 for drone 100 in secure storage 30. Device credentials 110 may include a device identifier (DI) 112 and a root authorization key (RAK) 114 for drone 100.

In other embodiments, a main processor may use specialized instructions for creating a TEE that uses main memory and for utilizing that TEE. For instance, to create and utilize a TEE, a device may use the technology provided by Intel Corporation under the name or trademark "Intel Software Guard Extensions" or "Intel SGX," or the technology provided by ARM Ltd. under the name or trademark "ARM TrustZone."

Referring again to FIG. 1, each of the other data processing systems within drone management system 10 may also feature processing resources such as processors, memory, TEEs, etc., to enable those devices to perform the functions described herein. However, to enhance clarity, FIG. 1 does not show all of the processing resources in each of the devices. Similarly, drone management system 10 may also include additional drones, FCTs, CBSs, and satellites like those shown in FIG. 1, even though such devices are omitted from FIG. 1 to enhance clarity.

However, in the embodiment of FIG. 1, each device includes its own TEE, and each of those TEEs securely stores device credentials for the device which contains that TEE. Thus, FCT 200 includes a TEE 230 containing device credentials 210 for FCT 200. Device credentials 210 include a DI 212, an RAK 214, and a DCRR 216. Similarly, CBS 300 includes a TEE 330 containing device credentials 310 for CBS 300. Device credentials 310 include a DI 312, an RAK 314, and a DCRR 316. Also, satellite 400 includes a TEE 430 containing device credentials 410 for satellite 400. Device credentials 410 include a DI 412, an RAK 414, and a DCRR 416. Cloud storage 500 may also include a TEE 530 with credentials 510 for the device hosting cloud storage 500. As described in greater detail below, a block chain 520 may also be stored in cloud storage 500.

For purposes of this disclosure, a block chain is a database or data structure that contains a continuously-growing list of data records, with each record referring to previous records on this list. A block chain is thus hardened against tampering and revision. Specifically, a block chain contains transaction records and block records. Transaction records are the primary content to be stored in the block chain. Transactions records are created by nodes or participants (such as drone 100, FCT 200, CBS 300, and satellite 400) to describe controller registration transactions. For instance, a transaction record may be created any time control of drone 100 is given to a new controller. In addition, each transaction record may be timestamped and digitally signed by the device which created it. After a device creates a transaction record, the device sends it to the cloud, where a cloud server creates a block record containing that transaction record, possibly along with other transaction records. In addition, the block record contains a hash of the prior block, thus linking the blocks together into a chain. Block records confirm when and in what sequence transactions are recorded in the block chain. The block chain may include all valid block records that have ever been created. A cloud server that creates block records may be referred to as a miner. CBSs, or any other suitable devices on the Internet, may serve as miners. The nodes may include a copy of some or all of the block chain. The nodes and/or the miners may contain a copy of the entire block chain or a portion of the block chain. For instance, when drone 100 sends a new transaction record to the cloud, drone 100 may also hash that record and then save the hash, to be used (as the previous-transaction-record hash) when creating the next transaction record for the next transfer of control, as described in greater detail below. For brevity, transaction records may be referred to as transactions, and block records may be referred to as blocks.

The following pseudocode illustrates an example structure for a DCRR:

```
dcr-record:: root-record\chained-hash
  root-record:: drone-record controller-record
    drone-record:: device-id device-description maker-id
      maker-public-key maker-signature
      device-id:: byte-string
      device-description:: byte-string
      maker-id:: byte-string
      maker-public-key:: public-key
      maker-signature:: signature
    controller-record:: ingress-public-key hash xfer-time
      navigation-record egress-endorsement
      ingress-public-key:: public-key
      hash:: bit-string
      xfer-time:: timestamp
      navigation-record:: nav-resources route plan
        nav-resources:: Sensors, 3D RealSense Context,
          Charger Doc Requirement
        route-plan:: Obstacle Identification, DCR Targets,
          Target-Destination, charging pit stops, fall back
          route
      egress-endorsement:: signature
  chained-hash::    HASH(previous-dcr-record-hash|new-
    root-record-hash)
    previous-dcr-record-hash::    HASH(previous-dcr-re-
      cord)
    new-root-record-hash:: HASH(root-record)
```

The egress-endorsement may contain a signature that authorizes the drone behavior while under the control of the controller. Also, an associated public key could be used to associate additional ancillary information as part of a certificate issued to the public key (e.g., an attribute certificate).

Referring again to FIG. 1, in addition to TEEs and device credentials, drone controllers may also include other features. For instance, FCT 200 may include a video receiver (VRX) 232 for receiving telemetry data transmitted by VTX 44 on drone 100. Likewise, CBS 300 may include a VRX 332, and satellite 400 may include a VRX 432. The different VRXs may be the same or similar. Alternatively, some of the VRXs may provide for more sophisticated processing, with regard to video processing, object identification, algorithm support for efficient routing protocols, etc.

In some embodiments, a device may implement resources such as processors, memory, and a security module as parts of a system on a chip (SoC). In other embodiments, some or all processing resources may be physically separate components that communicate with each other via buses or other communication conduits. Also, in some or all devices, the main memory may include software which executes on one or more processors. The software may include, for example, an OS, a virtual machine monitor (VMM), and various applications. A device may also include mass storage. Software and other data may be copied from the mass storage into memory. The processor may then execute the software from memory.

In the embodiment of FIG. 1, each of the devices includes software which executes in a TEE. For purposes of this disclosure, the software which executes in a TEE may be referred to as protected software. In the embodiment of FIG. 1, the protected software in drone 100 includes a controller registration module (CRM) 120. In other embodiments, controller registration modules may be implemented in hardware, or as a combination of hardware and software. In some or all embodiments, the controller registration module operates in a protected environment that cannot be accessed from outside of that environment.

For instance, in the embodiment of FIG. 1, TEE 26 prevents unauthorized applications or processes from accessing any of the data in TEE 26. TEE 26 may also verify the integrity of protected software such as controller registration module 120 before executing that software, to verify that the protected software is a trusted application that has not been tampered with. When controller registration module 120 needs sensitive data (e.g., DI 112, RAK 114, and DCRR 116) from secure storage 30, controller registration module 120 may copy that data into secure RAM 27.

As described in greater detail below, this disclosure describes several techniques that address the challenges associated with using telecommunications network infrastructure (or other drone controllers) for drone control and for drone telemetry (e.g., video).

Figure 2:
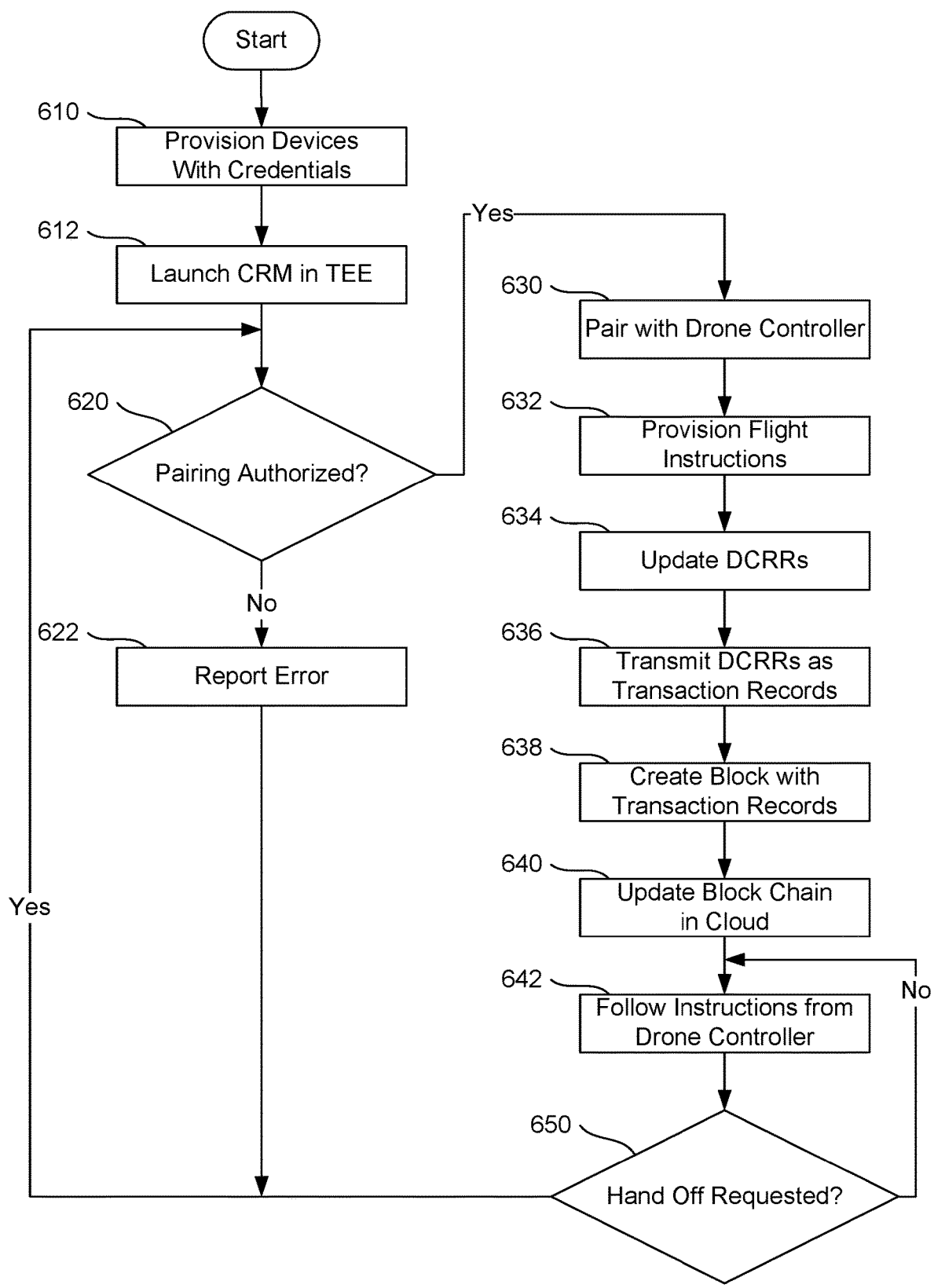
FIG. 2 is a flowchart of a process for managing transitions of drone control between drone controllers.

FIG. 2 is a flowchart of a process for managing transitions of drone control between drone controllers. In other words, FIG. 2 illustrates transfers of drone ownership. The process of FIG. 2 begins at block 610 with the manufacturer or the proprietor for each device in drone management system 10 provisioning that device with credentials. For instance, the manufacturer of drone 100 may provision drone 100 with DI 112, RAK 114, and DCRR 116. DI 112 may be an International Mobile Equipment Identity (IMEI) number or any other any suitable identifier that uniquely identifies drone 100.

To implement RAK 114, drone 100 may use technology such as that referred to by Intel Corporation under the name or trademark "Intel Enhanced Privacy ID" or "Intel EPID," for instance. In other words, RAK 114 may be implemented as an EPID key, and TEE 26 may use RAK 114 for attestation and to protect the integrity of DCRR 116. Accordingly, RAK 114 may constitute the public-key part of an endorsement key. As indicated at the Wikipedia entry for "Trusted computing," an endorsement key is a Rivest-Shamir-Adleman (RSA) "public and private key pair that is created randomly on the chip at manufacture time and cannot be changed. The private key never leaves the chip, while the public key is used for attestation and for encryption of sensitive data sent to the chip."

Controller registration module 120 may use DCRR 116 to identify which device is currently authorized to control drone 100. Accordingly, DCRR 116 may contain blanks or null values when drone 100 is initially provisioned, to indicate that there is no current owner. And as described in greater detail below, whenever drone 100 pairs with a controller, controller registration module 120 may update DCRR 116 to identify the current controller.

The provisioning operations may be considered to be out-of-band (OOB) operations. Some or all of those operations may be performed in the factory by the manufacturer of each device. In addition or alternatively, some or all of the provisioning operations may be performed in the field. For instance, the drone and the controllers or potential controllers may perform some of the provisioning operations via wired or wireless communications (e.g., "over-the-air"). For example, TEE 230 in FCT 200 may be provisioned with device credentials 210, TEE 330 in CBS 300 may be provisioned with device credentials 310, TEE 430 in satellite 400 may be provisioned with device credentials 410, and TEE 530 in cloud storage 500 may be provisioned with credentials 510. In one embodiment, each device gets a unique DI, and each device gets an RAK that is derived from the DI.

As shown at block 612, after provisioning is complete, drone 100 may then launch controller registration module 120 in TEE 26. The other devices (e.g., FCT 200, CBS 300, and satellite 400) may also launch controller registration modules in their respective TEEs.

As shown at block 620, controller registration module 120 in drone 100 may then determine whether pairing with a drone controller has been authorized. For instance, when drone 100 is initially deployed, it may be configured to pair with FCT 200, subject to user authorization. Controller registration module 120 may use any suitable technique to verify user authorization of the pairing. For instance, controller registration module 120 may cause a light emitting diode (LED) on drone 100 and/or on FCT 200 to illuminate, and controller registration module 120 may then determine whether the user has provided valid input via FCT 200 in response to that LED. In addition or alternatively, FCT 200 may provide the user with user interface (UI) options to authorize pairing (e.g., FCT 200 may prompt the user to enter a passcode). In addition or alternatively, as described in greater detail below, drone 100 and FCT 200 may perform some or all of the pairing operations automatically (i.e., without user input).

If FCT 200 does not pass authorization, drone 100 and/or FCT 200 may report an error, as shown at block 622, and the process may return to block 620 to try authorization again.

To perform remote attestation and pairing, FCT 200 and drone 100 may use provisioned credentials from secure storage in their respective TEE's and automatic operations within the respective TEEs. Any suitable challenge/response protocol may be used. For instance, controller registration module 120 may send device credentials 110 to FCT 200, and FCT 200 may send device credentials 210 to drone 100. Drone 100 and FCT 200 may then automatically complete authentication and pairing, based on those device credentials. If FCT 200 passes authorization, controller registration module 120 and a controller registration module in TEE 230 may recognize FCT 200 as the current controller or owner of drone 100, as shown at block 630.

In addition or alternatively, the devices may implement and enforce a roaming protocol that establishes a flight control key (FCK) for every stage of the operation for drone 100. To support that drone roaming protocol, controller registration module 120 may require FCT 200 to supply drone 100 with a new FCK during or after the pairing process. FCT 200 may then use that FCK to securely communicate with drone 100 for roaming policy management. For example, FCT 200 may generate FCK 220, and FCT 200 may send FCK 220 to drone 100 during or after the pairing process. (Similarly, CBS 300 may generate and share FCK 308, and satellite 400 may generate and share FCK 420, when those devices pair with drone 100.)

As shown at block 632, FCT 200 may use FCK 220 to securely provision drone 100 with autonomous flight instructions (AFI) 222. FCT 200 may also use FCK 220 to securely transmit dynamic flight instructions to drone 100. In addition, controllers may send multiple different sets of AFI to a drone over time. One or more of those sets may enable the drone to automatically adopt a reasonable behavior that ameliorates previously unanticipated circumstances. A controller could update the AFI, for instance, in response to discovering a bug in an algorithm that might be triggered by an environmental condition that might be met by the drone. The updated AFI could therefore avoid a potential or anticipated flight control failure.

As shown at block 634, controller registration module 120 may then update DCRR 116 to identify FCT 200 as the current owner. In particular, as described in greater detail below, controller registration module 120 may populate DCRR 116 with data to identify the drone (e.g., DI 112 and RAK 114) and data to identify the controller (e.g., DI 212 or RAK 214), along with any other information needed for DCRR 116 to serve as a block-chain transaction record. Likewise, FCT 200 may update DCRR 216 with information to identify drone 100 as being controlled by FCT 200, along with any other information needed to enable DCRR 216 to serve as a transaction record. And when similar operations are performed by controller registration modules in the other controllers (such as CBS 300 and satellite 400), each controller may update its DCRR similarly, to keep a log of which drones each controller has owned. Each DCRR may also list the FCK that the controller transmitted to the drone. Thus, the controller registration module in each device may log the pairing operations. The devices may store those logs in DCRRs in secure storage in TEEs (e.g., secure storage 30 in TEE 26).

Those DCRRs may also serve as transaction records for block chain 520. For instance, as shown at block 636, in response to a successfully pairing operation, controller registration modules in drone 100 and FCT 200 may send DCRR 116 and DCRR 216 to a cloud server (e.g., CBS 300). For instance, drone 100 and FCT 200 may use respective communication modules to communicate with the cloud sever via a wireless wide area network (WAN), via 3G or 4G cellular communications, and/or via any other suitable communications technology. The cloud server may then generate a block containing those transactions, as shown at block 638. The cloud server may add that block to block chain 520, as shown at block 640.

As shown at block 642, drone 100 may then follow autonomous flight instructions 222 and/or dynamic flight instructions from FCT 200, and drone 100 may send telemetry data to FCT 200. In addition, drone 100 and/or FCT 200 (or other controllers) may update DCRRs with flight history data, including (a) data describing any DFI received after pairing and (b) telemetry or sensor data describing what the drone actually did and where it actually went. Drone 100 and/or FCT 200 (or other controllers) may then send the updated DCRRs to the cloud as transactions to be added to block chain 520. Drones and controllers may be configured with policies to control such updates. For instance, those policies may cause a drone or a controller to send updates (a) periodically, (b) in response to a pull request from the cloud, and/or (c) whenever an ownership transfer happens.

As shown at block 650, drone control software 120 may then determine that whether control should be transferred to a different controller. For example, drone control software 120 may trigger a hand-off request in response to detecting that drone 100 has entered the coverage area of CBS 300; in response to determining that a different CBS has a stronger signal than a current CBS; in response to determining that no CBS signals can be detected, but communication is possible with satellite 400; etc. If no hand off has been requested, drone 100 may continue to follow instructions from FCT 200. However, if hand off has been requested, the process may return to block 620, with drone 100 authenticating the new potential controller, receiving new AFI from the new controller, sending telemetry data to the new controller, etc., as described above.

In an alternative scenario, instead of pairing first with an FCT, a drone may use operations like those described above to initially pair with a CBS or with any other suitable type of controller.

As indicated above, drone 100 may obtain a new FCK whenever control of drone 100 is handed off to (or acquired by) a new drone controller. Each base station or other controller may create that new FCK as part of the hand-off or acquisition process. Each controller may also use the FCK to supply drone 100 with autonomous flight instructions. Each controller may also keep a record of the relevant information each time the controller acquires control of a drone. For instance, as indicated above, the controller may store such information in a DCRR, and the controller may use that DCRR as a transaction record for block chain 520.

In addition, cloud storage 500 may enable authorized entities to independently inspect block chain 520, to review and track current and previous control acquisitions.

Transaction records in block chain 520 may also describe current and previous flight paths and such. For instance, controller registration module 120 may receive autonomous flight instructions from a controller, and controller registration module 120 may then store those instructions in DCRR 116. The controller may also log the autonomous flight instructions in its DCRR. Drone 100 and the controller may then send those DCRRs to the cloud, to be included in a block for block chain 520.

The autonomous flight instructions may include goal-directed objectives, policies, waypoints, maps, route definitions, etc. The autonomous flight instructions may cover phases that include, without limitation, resource allocation, goal definition, route planning, route execution, feedback, and re-planning and rerouting. Instructions for the planning phase (or for other phases) may include, for instance, geo-fence policies or "no-fly zones" that must be avoided, as well as flight corridor policies that must be adhered to. Autonomous flight instructions may also be referred to as autonomous mode configuration data.

Drone 100 may then use the autonomous flight instructions for autonomous navigation. For instance, drone 100 may fly autonomously according to the autonomous flight instructions in scenarios where contact with a flight control tower (e.g., CBS 300) is not possible at the current position, but may become possible as a result of completing the autonomous flight instructions.

Figure 3:
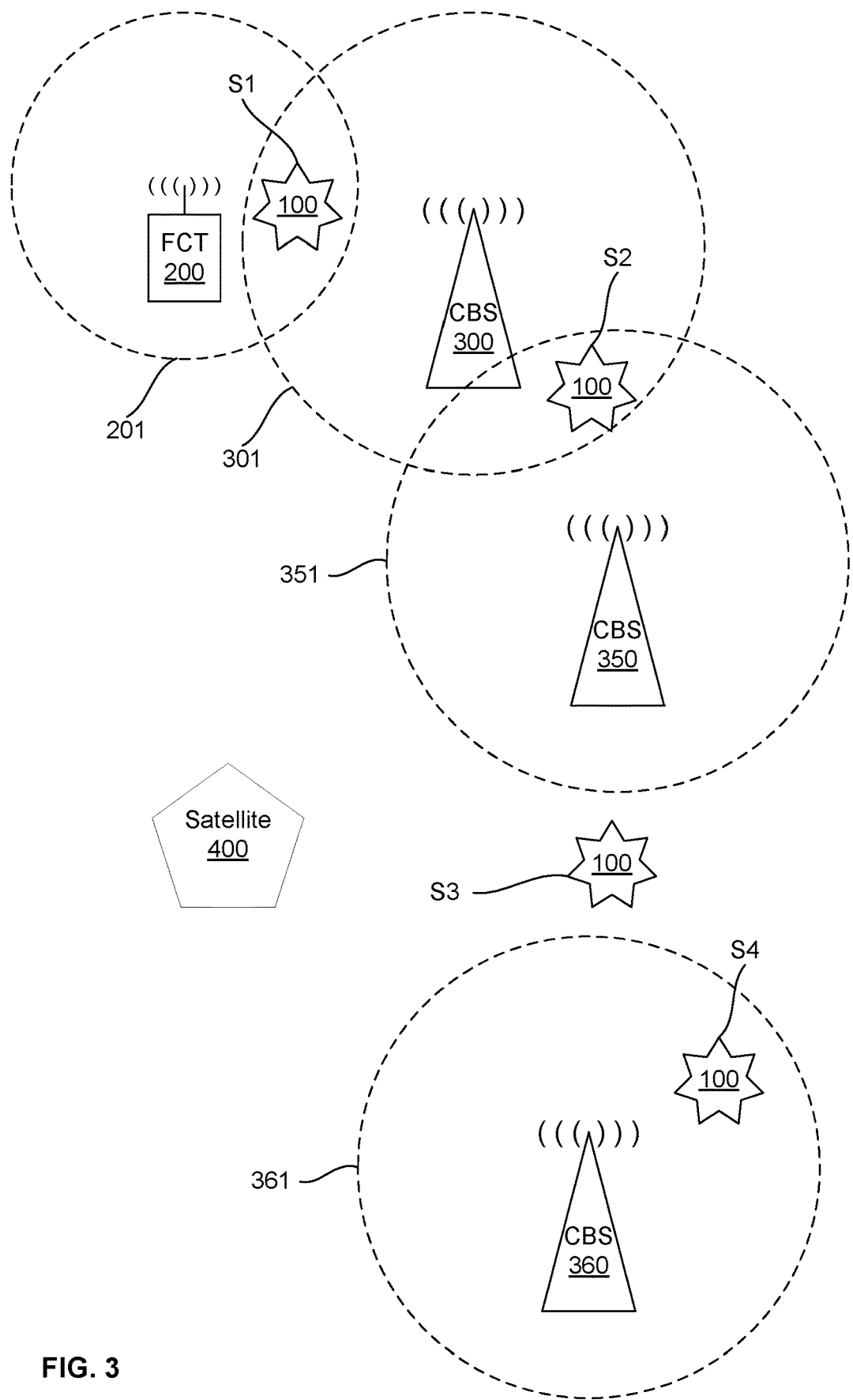
FIG. 3 is a schematic diagram illustrating one example scenario involving autonomous drone operation and another example scenario involving satellite-based drone control.

FIG. 3 is a schematic diagram illustrating one example scenario involving autonomous operation of drone 100 and another example scenario involving control of drone 100 by satellite 400. As described in greater detail below, in the scenario involving autonomous operation, control of drone 100 passes from FCT 200 to CBS 300 and then to another CBS 350. Drone 100 then flies or navigates autonomously. Another CBS 360 then registers with drone 100 as the current owner. In FIG. 3, dashed circle 201 illustrates the range or coverage area of FCT 200. Likewise, dashed circle 301 illustrates the coverage area of CBS 300, dashed circle 351 illustrates the coverage area of CBS 350, and dashed circle 361 illustrates the coverage area of CBS 360.

In the scenario involving autonomous operation, drone 100 may begin by pairing with FCT 200, as described above with regard to FIG. 2. As indicated above, a user may facilitate the pairing of drone with FCT 200 by authorizing the pairing operation, and controller registration module 120 may update DCRR 116 in secure storage 30 and block chain 520 in cloud storage 500 with data to document the transfer event.

After FCT 200 acquires control, a human operator may then fly drone 100 into the coverage area 301 for CBS 300, which overlaps with FCT coverage area 201. As illustrated, drone 100 may then reside at state 51. In response to detecting CBS 300, drone 100 may send a hand-off request to CBS 300. That hand-off request may include device credentials 110, as well as DCRR 116. CBS 300 may then register with drone 100 to receive a hand-off of control. For instance, a controller registration module in CBS 300 may use a process like that described above with regard to FCT 200 to authenticate and pair with drone 100, using device credentials 310 and FCK 320. The controller registration module in CBS 300 may then use FCK 320 to send autonomous flight instructions 322 to drone 100.

Controller registration module 120 may then update DCRR 116 to reflect the new ownership and the new instructions. For instance, controller registration module 120 may populate DCRR 116 with all of the information necessary to serve as a block-chain transaction record. That information may include all of the items listed above in the example structure for a DCRR, including (a) information for the drone such as
1. the "device-id" or DI for the drone,
2. a description of the drone,
3. an identifier for the drone manufacturer,
4. a public key from the drone manufacturer, and
5. a digital signature from the drone manufacturer;

(b) information for the current controller such as
1. an ingress-public-key,
2. a hash
3. a timestamp indicating when control was transferred to the current controller,
4. a navigation record including a description of available navigation resources and a description of a route plan, and
5. an egress endorsement signature; and (c) hash information to represent the current DCRR and to link that DCRR with the previous DCRR.

In one embodiment, the "digital signature from the drone manufacturer" signs all of the attributes in the record except for the signature itself. In other words, the digital signature is an encrypted hash of all of the attributes in the record except for the signature itself. Also, the "hash" for the current controller is a hash of the signed attributes. In other embodiments, some or all of the items in the above DCRR may be deleted and other items may be added.

After populating DCRR 116 with the relevant data, controller registration module 120 may then send DCRR 116 as a transaction record to a cloud server, for incorporation into a new block. The cloud server may then incorporate the transaction into a new block and add that block to block chain 520. In addition, CBS 300 may update its DCRR 316 to log acquisition of ownership of drone 200, and CBS 300 may also cause that transaction to be added to block chain 520.

Under control of CBS 300, drone 100 may then fly into coverage are 351 for CBS 350, as shown at state S2. Drone 100 and CBS 350 may then use operations like those described above to transfer control to CBS 350, to log the transfer, etc.

As shown at state S3, drone 100 may then enter a dead spot that is outside the range of any CBS. Drone 100 may then use context sensors (e.g., GPS, video, infrared, sonar, etc.) to navigate autonomously according to the provisioned AFI.

In one scenario, when CBS 350 initially obtains control of drone 100, CBS 350 may receive old the AFI (e.g., maps and navigation policies) from drone 100, and CBS 350 may use that information to compute new AFI to enable drone 100 to navigate from CBS 350 to CBS 360. For instance, the new AFI may include maps and other data that establish a geo-fence definition of a route from coverage area 350 to coverage area 351. CBS 350 may then send the new AFI to drone 100. Controller registration module 120 may then store the new AFI in TEE 26. Based on the new AFI, drone 100 may then navigate autonomously through the dead spot and into coverage area 361, where drone 100 can regain tower connectivity.

Once drone 100 enters coverage area 361, CBS 361 may then take control of drone 100 using a process like that described above. Drone 100 may then continue to navigate using CBSs or autonomously, as necessary.

Furthermore, drone 100 may use TEE 26 to protect some or all of the navigation context during autonomous navigation. The navigation context may include, for instance, the 3D orientation of drone 100, the GPS coordinates of drone 100, and any other information detected by the sensors in drone 100.

In another scenario, CBS 350 hands off control of drone 100 to satellite 400 when drone 100 leaves coverage area 351. For instance, if drone 100 is unable to detect a signal from any FCT or any CBS, drone 100 may contact satellite 400 to request pairing. Alternatively, the current AFI in drone 100 may instruct drone 100 to request pairing with satellite 400 under certain predetermined conditions. In either case, a controller registration module in satellite 400 may then use a process like that described above with regard to FCT 200 to authenticate and pair with drone 100, using device credentials 410 and FCK 420.

The controller registration module in satellite 400 may then use FCK 420 to send fresh autonomous flight instructions 422 to drone 100. In addition or alternatively, satellite 400 may send dynamic instructions to drone 100. For instance, the instructions may provide for brief periods of autonomous navigation while primarily under dynamic control from a human operator. Satellite 400 may also receive telemetry data from drone 100. The flight instructions may be designed to compensate for added control and telemetry latency of about five seconds, introduced by the longer transmission times experienced by satellite communication.

Thus, drone 100 may be managed by a CBS or other terrestrial controllers if possible, and by a satellite when in dead spots with no coverage.

Figure 4:
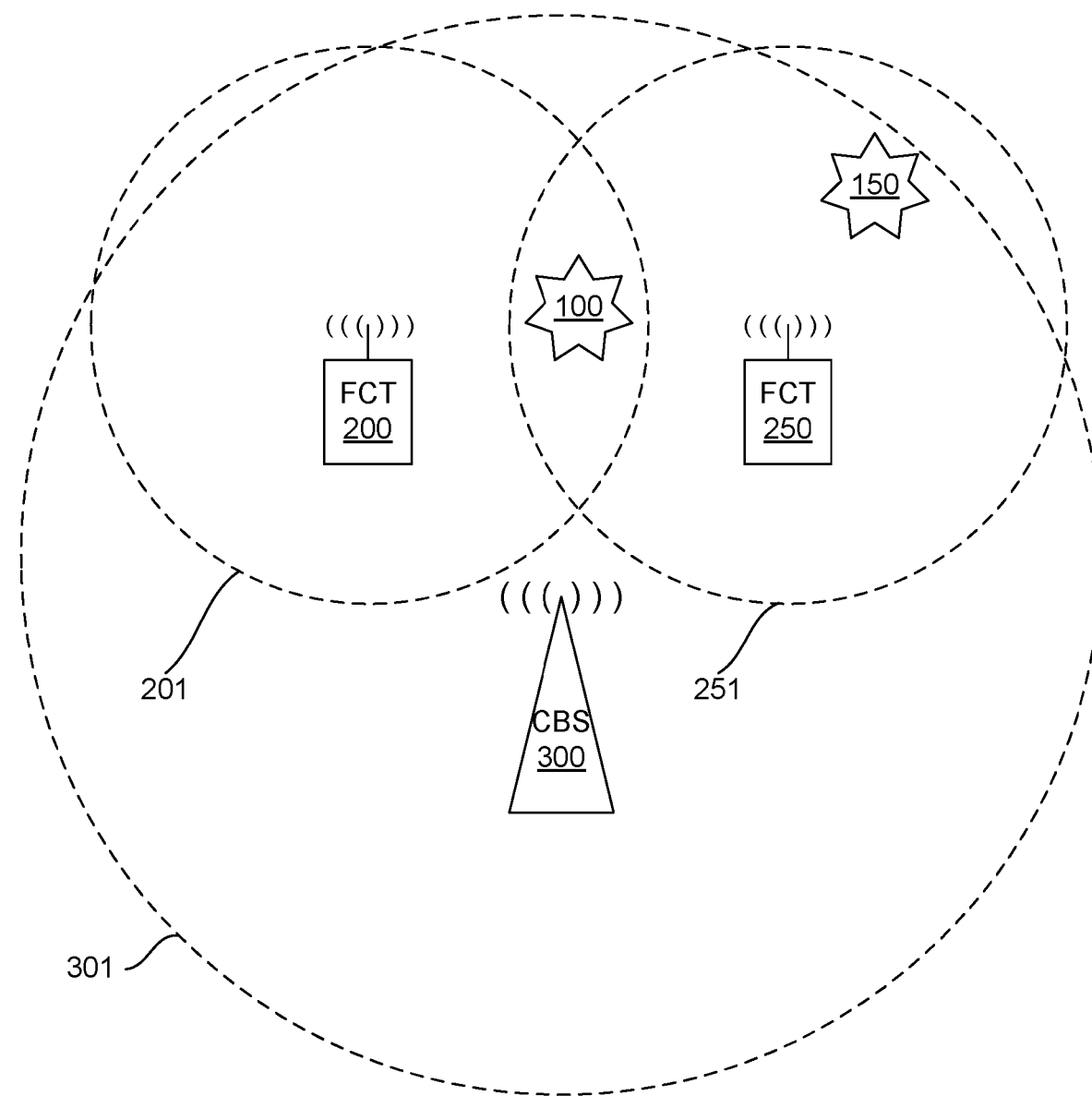
FIG. 4 is a schematic diagram illustrating an example scenario involving multiple drones and multiple controllers.

FIG. 4 is a schematic diagram illustrating an example scenario involving multiple drones and multiple controllers. In particular, FIG. 4 illustrates FCT 200 with operating range 201 and an FCT 250 with an operating range 251 that partially overlaps operating range 201. In addition, FIG. 4 illustrates that coverage area 301 for CBS 300 overlaps some of coverage area 201 and some of coverage area 251. FIG. 4 also illustrates drone 100 located in the overlapping region of areas 201 and 251, as well as a drone 150 within area 251 but outside of area 201. FCT 200, FCT 250, CBS 300, drone 100, and drone 150 may use operations like those described above to transfer control of a drone from one controller to another.

In addition, the operations and data structures described above may be extended to enable one controller to control multiple drones simultaneously. For instance, FCT 250 or CBS 300 may be configured to control drone 100 and drone 150 simultaneously. In such a scenario, a controller may dynamically maintain and manage an array of DCRRs, FCKs, AFIs, etc., for each of the managed drones. For example, as indicated above, the pairing process involves an attestation from the drone to the controller. This attestation authenticates the drone's TEE and its security properties. The contents of the DCRR from the drone further identify the drone to the controller. A key exchange protocol such as Diffie-Hellman may be used to establish session keys, which may be used to construct a secure channel. For example, the drone and the controller may use the Transport Layer Security (TLS) protocol to exchange keys and establish a secure session. They drone and the controller may then use that secure session to send and receive flight control messages, telemetry, etc. In addition, the controller may open a second session with a second connection to a second drone, as needed to simultaneously control other drones.

Figure 5:
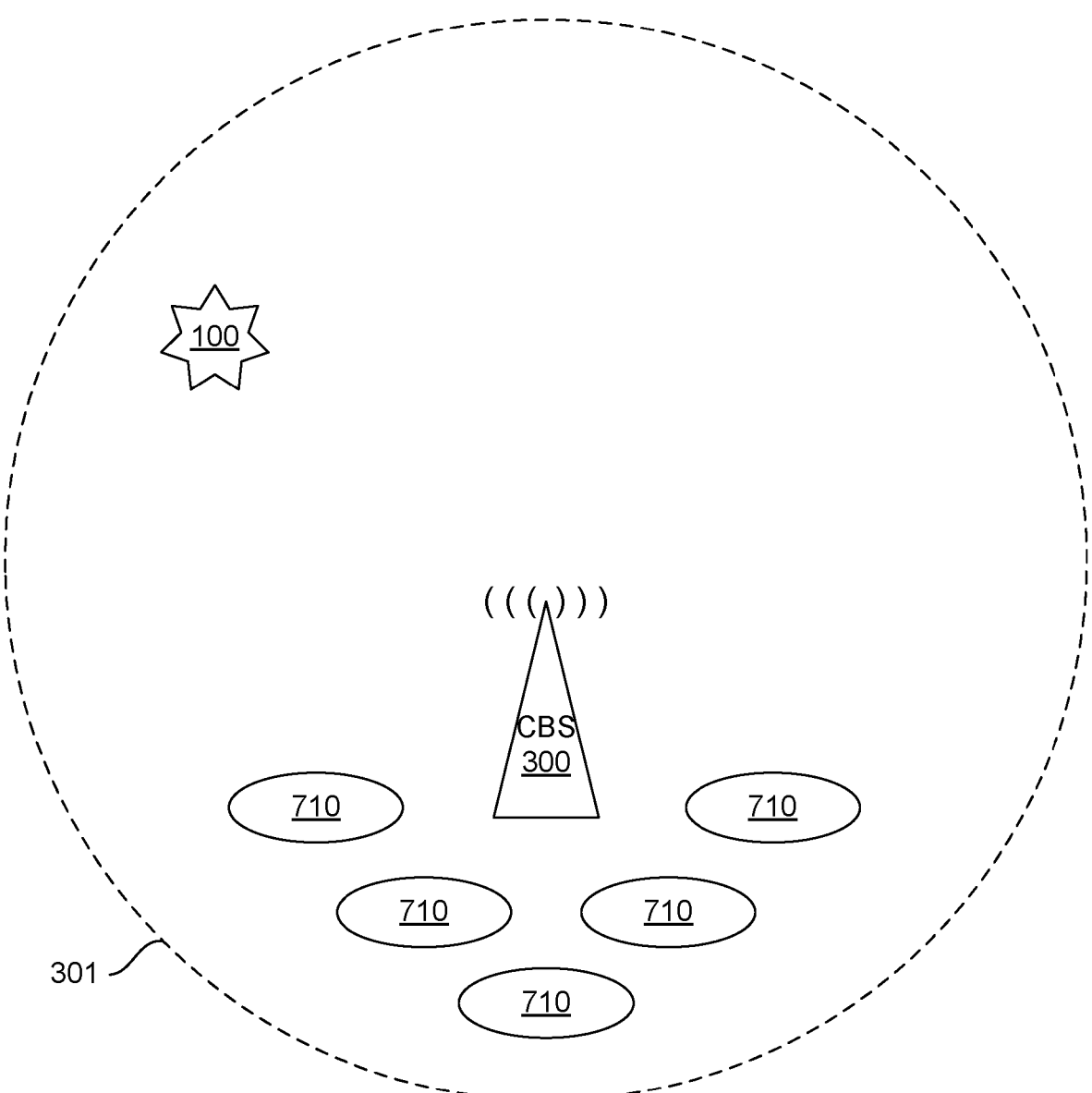
FIG. 5 is a schematic diagram illustrating an example scenario involving drone recharging stations.

FIG. 5 is a schematic diagram illustrating an example scenario involving recharging base stations that drones can use to recharge. In particular, FIG. 5 illustrates drone 100 and CBS 300, along with numerous recharging stations 710 that are managed by CBS 300. CBS 300 may serve as a docking tower. As described in greater detail below, CBS 300 and recharging stations 710 may serve as a wireless drone charging farm.

In one scenario, when drone 100 enters coverage area 301, drone 100 may establish a secure communications channel with CBS 300. CBS 300 and drone 100 may then perform remote attestation, and drone 100 may update DCRR 116 to reflect an ownership transfer to CBS 300, as described above. CBS 300 may also update DCRR 316, and the updates to the DCRRs may be logged, as described above. Drone 100 may then use the secure channel to send power charging requirements (e.g., voltage, wattage, coil area, residual energy remaining, expected energy needs to get to the next charging station, etc.) to CBS 300. In response, CBS 300 may then determine whether any available charging stations are suitable for drone 100. If not suitable charging stations are available, CBS 300 may notify drone 100, and in response drone 100 may implement a fallback plan. For instance, drone 100 may wait for a charging station, drone 100 may repeat the request, or drone 100 may move on to another base station.

If a suitable charging station is available, CBS 300 may then direct drone 100 to that charging station. For instance, CBS 300 may send GPS coordinates for that charging station to drone 100. In addition or alternatively, CBS 300 may use other beaconing techniques. For instance, if GPS precision is insufficient (e.g., less than 2.5 meters), CBS 300 may send autonomous flight instructions 322 to drone 100, to autonomously guide drone 100 to a charging station landing zone. For example, each charging station may have a unique identifier and a unique QR code. The QR code may be optically detectable on a landing strip for the charging station. CBS 300 may send the identifier and the QR code for the selected charging station to drone 100. In addition or alternatively, each charging station 710 may use ultra-sonic techniques such as Doppler-effect strobes to establish a close range, high resolution 3D coordinate system and to broadcast the landing zone identifier. In addition or alternatively, a charging station 710 may use an infrared emitter that modulates intensity and period to communicate the drone's position relative to the landing zone. Other embodiments may use other techniques.

Once drone 100 has landed or docked on a charging station, drone 100 may wirelessly recharge. In addition, CBS 300 may track usage of the charging stations, and that data may be used to bill the operator of any drones that have recharge for the recharging services.

In one embodiment, when demand for charging stations is high, the controller offers the drone an option to pay a premium for expedited allocation of a charging station. Based on the urgency of the charging needs, the drone may then accept the offer and pay the higher charge in return for expedited treatment (e.g., immediate access to a charging station).

As has been described, a drone maintains a registration record (e.g., DCRR 116). That record identifies the current controller as well as the current flight control policies. The drone uses a TEE to protect that data. Consequently, even though the drone may be flying in an area with overlapping coverage from multiple potential controllers, the registration record specifies which device has control at any point in time. Furthermore, controllers may provision drones with autonomous flight instructions which enable drones to autonomously navigate from a first tower to a second tower, when those towers do not have overlapping ranges. Drones may use such autonomous flight instructions to continue navigating despite communication interruptions due to weather, natural or man-made disasters, etc.

In some situations, a controller may automatically figure out what instructions to send to the drone, without any human input. In other situations, the flight instructions may be based on human input. For instance, human administrator can use a remote workstation to monitor for drone management alerts from a controllers and drones. If the administrator receives such an alert, the administrator may provide instructions at the workstation, and the workstation may send those instructions to the relevant controller and/or drone. Those instructions may include, for instance, an updated roaming policy for the drone.

In addition, a public record in the form of a block chain can be used to track drone control activity and to resolve disputes of control if necessary. The block chain includes a hash of current and past registration records, to provide a verifiable history of the owners of a drone. For instance, each time a device creates a new registration record, the old registration record may be hashed and signed by the device using a key embedded in the device by the manufacturer of the device. The block chain can be used like a digital fingerprint, to reliably determine whether the drone was ever provisioned with a prohibited configuration. In suitable situations (e.g., when legally required), a cleartext log may be presented as evidence, and then the hash values in the block chain may be used to corroborate the cleartext log.

Also, privacy sensitive information may be protected by restricting the information contributed to the block chain. This protection may be achieved by hashing the root record. Unless a block chain observer knows the contents of the root record, the observer will not be able to determine privacy sensitive information that was contributed to the block chain. In addition a blinding value (e.g., a large random number) could be added to the root record to prevent unauthorized observers from extracting data from the block chain.

In one embodiment, a verifier of transactions (e.g., a block chain miner) is required to have access rights to add hash values (or other data) to the block chain. A miner is the entity that posts blocks of transactions to the block chain. In one embodiment, miners must receive credentials that authorize them to post to (and read from) the block chain.

An unauthorized party cannot create a fake block chain because that party does not possess the DCRR key. When a new DCRR is established, the new record is populated with a new key. The root record is digitally signed. DCRR creation is achieved using a secure protocol, such that a new DCRR contains a hash of the previous DCRR, and the result is contributed to the block chain. But a third-party observer must have prior knowledge of the key values in order to reconstruct the AFI.

Also, even though a drone may be flying in a region of overlapping controller coverage, the DCRR may be used to determine which controller controls the drone at any point in time. For example, the DCRR in the drone and in the block chain can be updated on each ownership transfer, to identify to which owner the drone currently belongs to.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. For instance, flight control systems for drones may be developed using the library known by the name or trademark "Open Source Computer Vision" or "OpenCV" and with the library known by the name or trademark "Intel Integrated Performance Primitives" or "Intel IPP."

As indicated above, the present teachings may be used to advantage in many different kinds of data processing systems. Example data processing systems include, without limitation, SoCs, MCUs, wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., an SoC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, random access memory (RAM), and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a drone with technology for tracking controllers. The drone comprises (a) a communications subsystem which enables the drone to receive data from remote devices; and (b) a controller registration module. The controller registration module enables the drone to receive a first controller identifier from a first remote device, via the communications subsystem. The controller registration module also enables the drone to, in response to receiving the first controller identifier, register the first remote device as a current controller for the drone. Registering the first remote device comprises adding the first controller identifier to a drone control registration record (DCRR) in the drone. The controller registration module also enables the drone to, after adding the first controller identifier to the DCRR, cause the DCRR to be added to a block chain in remote storage. The controller registration module also enables the drone to, after adding the first controller identifier to the DCRR, receive a second controller identifier from a second remote device. The controller registration module also enables the drone to, in response to receiving the second controller identifier, register the second remote device as the current controller for the drone. Registering the second remote device comprises creating an updated DCRR that identifies the second remote device as the current controller. The controller registration module also enables the drone to, after creating the updated DCRR, cause the updated DCRR to be added to the block chain in remote storage.

Example A2 is a drone according to Example A1, wherein the drone further comprises technology to establish a trusted execution environment (TEE) within the drone, wherein the technology to establish the TEE comprises protected storage. Also, the controller registration module is configured to (a) receive the controller identifiers from the first and second remote devices while executing in the TEE, (b) create the updated DCRR while executing in the TEE, and (c) save the DCRR in the protected storage while executing in the TEE.

Example A3 is a drone according to Example A1, wherein the first controller identifier comprises a first flight control key, and the second controller identifier comprises a second flight control key. Example A3 may also include the features of Example A2.

Example A4 is a drone according to Example A1, wherein the controller registration module enables the drone to (a) receive autonomous flight instructions for the drone from the first remote device, and (b) save at least some of the autonomous flight instructions in the DCRR before causing the DCRR to be added to the block chain in remote storage. Example A4 may also include the features of any one or more of Examples A2 through A3.

Example A5 is a drone according to Example A4, wherein the controller registration module enables the drone to (a) after receiving autonomous flight instructions at the drone from the first remote device, travel outside of a coverage area of the first remote device; and (b) follow the autonomous flight instructions while traveling outside of the coverage area of the first remote device.

Example A6 is a drone according to Example A5, wherein, when the autonomous flight instructions prescribe a flight path from the coverage area of the first remote device to the coverage area of the second remote device, the controller registration module enables the drone to (a) after following the autonomous flight instructions while traveling outside of the coverage area of the first remote device, enter a coverage area of the second remote device; and (b) receive the second controller identifier from the second remote device after entering the coverage area of the second remote device.

Example A7 is a drone according to Example A1, wherein, when the second device comprises a cellular base station (CBS), the controller registration module enables the drone to (a) receive flight instructions from the CBS directing the drone to a recharging base station associated with the CBS; (b) follow the flight instructions from the CBS directing the drone to the recharging base station; and (c) use the recharging base station to recharge the drone. Example A7 may also include the features of any one or more of Examples A2 through A6.

Example A8 is a drone according to Example A1, wherein the controller registration module enables the drone to (a) receive the first controller identifier from a cellular base station (CBS); and (b) receive the second controller identifier from a satellite. Example A8 may also include the features of any one or more of Examples A2 through A7.

Example A9 is a drone according to Example A8, wherein the controller registration module enables the drone to send telemetry data from the drone to the satellite after registering the satellite as the current controller for the drone.

Example B1 is an apparatus to enable a drone to track controllers. The apparatus comprises at least one non-transitory machine-accessible storage medium and a controller registration module in the machine-accessible storage medium. When the controller registration module is executed by a processor of a drone, the controller registration module enables the drone to (a) receive a first controller identifier from a first remote device; (b) in response to receiving the first controller identifier, register the first remote device as a current controller for the drone, wherein registering the first remote device comprises adding the first controller identifier to a drone control registration record (DCRR) in the drone; (c) after adding the first controller identifier to the DCRR, cause the DCRR to be added to a block chain in remote storage; (d) after adding the first controller identifier to the DCRR, receive a second controller identifier from a second remote device; (e) in response to receiving the second controller identifier, register the second remote device as the current controller for the drone, wherein registering the second remote device comprises creating an updated DCRR that identifies the second remote device as the current controller; and (f) after creating the updated DCRR, cause the updated DCRR to be added to the block chain in remote storage.

Example B2 is an apparatus according to Example B1, wherein the controller registration module is configured to (a) execute in a trusted execution environment (TEE) in the drone, wherein the TEE comprises protected storage; (b) receive the controller identifiers from the first and second remote devices while executing in the TEE; (c) create the updated DCRR while executing in the TEE; and (d) save the DCRR in the protected storage while executing in the TEE.

Example B3 is an apparatus according to Example B1, wherein the controller registration module enables the drone to (a) receive autonomous flight instructions for the drone from the first remote device; and (b) save at least some of the autonomous flight instructions in the DCRR before causing the DCRR to be added to the block chain in remote storage. Example B3 may also include the features of Example B2.

Example B4 is an apparatus according to Example B1, wherein the controller registration module enables the drone to (a) after receiving autonomous flight instructions at the drone from the first remote device, travel outside of a coverage area of the first remote device; and (b) follow the autonomous flight instructions while traveling outside of the coverage area of the first remote device. Example B4 may also include the features of any one or more of Examples B2 through B3.

Example B5 is an apparatus according to Example B4, wherein, when the autonomous flight instructions prescribe a flight path from the coverage area of the first remote device to the coverage area of the second remote device, the controller registration module enables the drone to (a) after following the autonomous flight instructions while traveling outside of the coverage area of the first remote device, enter a coverage area of the second remote device; and (b) receive the second controller identifier from the second remote device after entering the coverage area of the second remote device.

Example B6 is an apparatus according to Example B1, wherein, when the second device comprises a cellular base station (CBS), the controller registration module enables the drone to (a) receive flight instructions from the CBS directing the drone to a recharging base station associated with the CBS; (b) follow the flight instructions from the CBS directing the drone to the recharging base station; and (c) use the recharging base station to recharge the drone. Example B6 may also include the features of any one or more of Examples B2 through B5.

Example B7 is an apparatus according to Example B1, wherein the controller registration module enables the drone to (a) receive the first controller identifier from a cellular base station (CBS); and (b) receive the second controller identifier from a satellite.

Example B8 is an apparatus according to Example B7, wherein the controller registration module enables the drone to send telemetry data from the drone to the satellite after registering the satellite as the current controller for the drone.

Example C1 is a method for tracking drone controllers. The method comprises (a) at a drone, receiving a first controller identifier from a first remote device; (b) in response to receiving the first controller identifier, registering the first remote device as a current controller for the drone, wherein registering the first remote device comprises adding the first controller identifier to a drone control registration record (DCRR) in the drone; (c) after adding the first controller identifier to the DCRR, causing the DCRR to be added to a block chain in remote storage; (d) after adding the first controller identifier to the DCRR, receiving a second controller identifier from a second remote device; (e) in response to receiving the second controller identifier, registering the second remote device as the current controller for the drone, wherein registering the second remote device comprises creating an updated DCRR that identifies the second remote device as the current controller; and (f) after creating the updated DCRR, causing the updated DCRR to be added to the block chain in remote storage.

Example C2 is a method according to Example C1, wherein the method further comprises saving the DCRR in protected storage in the drone.

Example C3 is a method according to Example C1, wherein the method further comprises (a) establishing a trusted execution environment (TEE) in the drone, wherein the TEE provides security for the protected storage; and (b) executing a controller registration module in the TEE. Also, the operations of receiving controller identifiers from the first and second remote devices are performed by the controller registration module while executing in the TEE. Also, the operation of creating the updated DCRR is performed by the controller registration module while executing in the TEE. Also, the controller registration module saves the DCRR in the protected storage in the TEE while executing in the TEE. Example C3 may also include the features of Example C2.

Example C4 is a method according to Example C1, wherein the first controller identifier comprises a first flight control key, and the second controller identifier comprises a second flight control key. Example C4 may also include the features of any one or more of Examples C2 through C3.

Example C5 is a method according to Example C1, wherein the method further comprises (a) at the drone, receiving autonomous flight instructions for the drone from the first remote device; and (b) saving at least some of the autonomous flight instructions in the DCRR before causing the DCRR to be added to the block chain in remote storage. Example C5 may also include the features of any one or more of Examples C2 through C4.

Example C6 is a method according to Example C5, wherein the method further comprises (a) after receiving autonomous flight instructions at the drone from the first remote device, traveling outside of a coverage area of the first remote device; and (b) following the autonomous flight instructions while traveling outside of the coverage area of the first remote device.

Example C7 is a method according to Example C6, wherein the method further comprises, after following the autonomous flight instructions while traveling outside of the coverage area of the first remote device, entering a coverage area of the second remote device. Also, the operation of receiving the second controller identifier from the second remote device is performed after entering the coverage area of the second remote device.

Example C8 is a method according to Example C7, wherein the autonomous flight instructions prescribe a flight path from the coverage area of the first remote device to the coverage area of the second remote device.

Example C9 is a method according to Example C1, wherein the second device comprises a cellular base station (CBS), and the method further comprises (a) receiving flight instructions from the CBS directing the drone to a recharging base station associated with the CBS; (b) following the flight instructions from the CBS directing the drone to the recharging base station; and (c) using the recharging base station to recharge the drone. Example C9 may also include the features of any one or more of Examples C2 through C8.

Example C10 is a method according to Example C9, wherein the method further comprises (a) keeping records of recharging services used by the drone, and (b) billing a proprietor of the drone for the recharging services used by the drone.

Example C11 is a method according to Example C1, wherein the first device comprises a cellular base station (CBS), and the second device comprises a satellite. Example C11 may also include the features of any one or more of Examples C2 through C10.

Example C12 is a method according to Example C11, wherein the method further comprises, after registering the satellite as the current controller for the drone, sending telemetry data from the drone to the satellite.

Example D1 is a method for determining drone ownership. The method comprises (a) obtaining a copy of at least part of a block chain containing at least one drone control registration record (DCRR) for a drone; and (b) using the DCRR to determine which device is registered as a controller of the drone.

Example D2 is a method according to Example D1, wherein the operation of using the DCRR to determine which device is registered as a controller of the drone is performed when the drone is located in an area of overlapping coverage involving a first coverage area from a first potential drone controller and a second coverage area from a second potential drone controller.

Example E is at least one machine-accessible medium comprising computer instructions for tracking drone controllers. The computer instructions, in response to being executed on a drone, enable the drone to perform a method according to any of Examples C1 through C12 and D1 through D2.

Example F is a drone with technology for tracking controllers. The drone comprises a processing element, at least one machine-accessible medium responsive to the processing element, and computer instructions stored at least partially in the at least one machine-accessible medium. The computer instructions, in response to being executed, enable the drone to perform a method according to any of Examples C1 through C12 and D1 through D2.

Example G is a drone with technology for tracking controllers. The drone comprises means for performing a method according to any of Examples C1 through C12 and D1 through D2.

What is claimed is:

1. An apparatus comprising:
   one or more processors of a drone to track controllers, wherein the one or more processors are configured to:
   receive a first controller identifier from a first remote device;
   in response to receiving the first controller identifier, register the first remote device as a current controller for the drone, wherein registering the first remote device comprises adding the first controller identifier to a drone control registration record (DCRR) in the drone;
   after adding the first controller identifier to the DCRR, cause the DCRR to be added to a block chain in remote storage;
   after adding the first controller identifier to the DCRR, receive a second controller identifier from a second remote device;
   in response to receiving the second controller identifier, register the second remote device as the current controller for the drone, wherein registering the second remote device comprises creating an updated DCRR that identifies the second remote device as the current controller; and
   after creating the updated DCRR, cause the updated DCRR to be added to the block chain in remote storage.

2. The apparatus of claim 1, wherein the one or more processors are further configured to:
   execute in a trusted execution environment (TEE) in the drone, wherein the TEE comprises protected storage;
   receive the controller identifiers from the first and second remote devices while executing in the TEE;
   create the updated DCRR while executing in the TEE;
   save the DCRR in the protected storage while executing in the TEE;
   receive autonomous flight instructions for the drone from the first remote device; and
   save at least some of the autonomous flight instructions in the DCRR before causing the DCRR to be added to the block chain in remote storage.

3. The apparatus of claim 1, wherein the one or more processors are further configured to:
   after receiving autonomous flight instructions at the drone from the first remote device, travel outside of a coverage area of the first remote device; and
   follow the autonomous flight instructions while traveling outside of the coverage area of the first remote device,
   wherein, when the autonomous flight instructions prescribe a flight path from the coverage area of the first remote device to the coverage area of the second remote device, the one or more processors are further configured to:
   after following the autonomous flight instructions while traveling outside of the coverage area of the first remote device, enter a coverage area of the second remote device; and
   receive the second controller identifier from the second remote device after entering the coverage area of the second remote device.

4. The apparatus of claim 1, wherein, when the second remote device comprises a cellular base station (CBS), the one or more processors are further configured to:
   receive flight instructions from the CBS directing the drone to a recharging base station associated with the CBS;
   follow the flight instructions from the CBS directing the drone to the recharging base station; and
   use the recharging base station to recharge the drone.

5. The apparatus of claim 1, wherein the one or more processors are further configured to:
   receive the first controller identifier from a cellular base station (CBS); and
   receive the second controller identifier from a satellite, wherein the controller registration module enables the drone to send telemetry data from the drone to the satellite after registering the satellite as the current controller for the drone.

6. A method comprising:
   receiving, at a drone for tracking controllers, a first controller identifier from a first remote device;
   in response to receiving the first controller identifier, registering the first remote device as a current controller for the drone, wherein registering the first remote device comprises adding the first controller identifier to a drone control registration record (DCRR) in the drone;
   after adding the first controller identifier to the DCRR, causing the DCRR to be added to a block chain in remote storage;
   after adding the first controller identifier to the DCRR, receiving a second controller identifier from a second remote device;
   in response to receiving the second controller identifier, registering the second remote device as the current controller for the drone, wherein registering the second remote device comprises creating an updated DCRR that identifies the second remote device as the current controller; and
   after creating the updated DCRR, causing the updated DCRR to be added to the block chain in remote storage.

7. The method of claim 6, further comprising:
saving the DCRR in protected storage in the drone;
establishing a trusted execution environment (TEE) in the drone, wherein the TEE provides security for the protected storage; and
executing a controller registration module in the TEE,
wherein the operations of receiving controller identifiers from the first and second remote devices are performed by the controller registration module while executing in the TEE,
wherein the operation of creating the updated DCRR is performed by the controller registration module while executing in the TEE, and
wherein the controller registration module saves the DCRR in the protected storage in the TEE while executing in the TEE.

8. The method of claim 6, further comprising:
at the drone, receiving autonomous flight instructions for the drone from the first remote device; and
saving at least some of the autonomous flight instructions in the DCRR before causing the DCRR to be added to the block chain in remote storage.

9. The method of claim 6, wherein:
the second device comprises a cellular base station (CBS); and
the method further comprises:
receiving flight instructions from the CBS directing the drone to a recharging base station associated with the CBS;
following the flight instructions from the CBS directing the drone to the recharging base station; and
using the recharging base station to recharge the drone.

10. A non-transitory computer-readable medium having stored thereon instructions which, when executed, causes a processing device of a drone for tracking controllers to perform operations comprising:
receiving a first controller identifier from a first remote device;
in response to receiving the first controller identifier, registering the first remote device as a current controller for the drone, wherein registering the first remote device comprises adding the first controller identifier to a drone control registration record (DCRR) in the drone;
after adding the first controller identifier to the DCRR, causing the DCRR to be added to a block chain in remote storage;
after adding the first controller identifier to the DCRR, receiving a second controller identifier from a second remote device;
in response to receiving the second controller identifier, registering the second remote device as the current controller for the drone, wherein registering the second remote device comprises creating an updated DCRR that identifies the second remote device as the current controller; and
after creating the updated DCRR, causing the updated DCRR to be added to the block chain in remote storage.

11. The non-transitory computer-readable medium of claim 10, wherein the operations further comprise:
saving the DCRR in protected storage in the drone;
establishing a trusted execution environment (TEE) in the drone, wherein the TEE provides security for the protected storage; and
executing a controller registration module in the TEE,
wherein the operations of receiving controller identifiers from the first and second remote devices are performed by the controller registration module while executing in the TEE,
wherein the operation of creating the updated DCRR is performed by the controller registration module while executing in the TEE, and
wherein the controller registration module saves the DCRR in the protected storage in the TEE while executing in the TEE.

12. The non-transitory computer-readable medium of claim 10, wherein the operations further comprise:
at the drone, receiving autonomous flight instructions for the drone from the first remote device; and
saving at least some of the autonomous flight instructions in the DCRR before causing the DCRR to be added to the block chain in remote storage.

13. The non-transitory computer-readable medium of claim 10, wherein the second device comprises a cellular base station (CBS), and wherein the operations further comprise:
receiving flight instructions from the CBS directing the drone to a recharging base station associated with the CBS;
following the flight instructions from the CBS directing the drone to the recharging base station; and
using the recharging base station to recharge the drone.

14. A system comprising:
one or more processors of a drone to track controllers; and
a memory coupled with the one or more processors, wherein the one or more processors are configured to:
receive a first controller identifier from a first remote device;
in response to receiving the first controller identifier, register the first remote device as a current controller for the drone, wherein registering the first remote device comprises adding the first controller identifier to a drone control registration record (DCRR) in the drone;
after adding the first controller identifier to the DCRR, cause the DCRR to be added to a block chain in remote storage;
after adding the first controller identifier to the DCRR, receive a second controller identifier from a second remote device;
in response to receiving the second controller identifier, register the second remote device as the current controller for the drone, wherein registering the second remote device comprises creating an updated DCRR that identifies the second remote device as the current controller; and
after creating the updated DCRR, cause the updated DCRR to be added to the block chain in remote storage.

15. The system of claim 14, wherein the one or more processors are further configured to:
execute in a trusted execution environment (TEE) in the drone, wherein the TEE comprises protected storage;
receive the controller identifiers from the first and second remote devices while executing in the TEE;
create the updated DCRR while executing in the TEE;
save the DCRR in the protected storage while executing in the TEE;
receive autonomous flight instructions for the drone from the first remote device; and save at least some of the autonomous flight instructions in the DCRR before causing the DCRR to be added to the block chain in remote storage.

16. The system of claim 14, wherein the one or more processors are further configured to:
   after receiving autonomous flight instructions at the drone from the first remote device, travel outside of a coverage area of the first remote device; and
   follow the autonomous flight instructions while traveling outside of the coverage area of the first remote device, wherein, when the autonomous flight instructions prescribe a flight path from the coverage area of the first remote device to the coverage area of the second remote device, the one or more processors are further configured to:
   after following the autonomous flight instructions while traveling outside of the coverage area of the first remote device, enter a coverage area of the second remote device; and
   receive the second controller identifier from the second remote device after entering the coverage area of the second remote device.

17. The system of claim 14, wherein, when the second remote device comprises a cellular base station (CBS), the one or more processors are further configured to:
   receive flight instructions from the CBS directing the drone to a recharging base station associated with the CBS;
   follow the flight instructions from the CBS directing the drone to the recharging base station; and
   use the recharging base station to recharge the drone.

18. The system of claim 14, wherein the one or more processors are further configured to:
   receive the first controller identifier from a cellular base station (CBS); and
   receive the second controller identifier from a satellite, wherein the controller registration module enables the drone to send telemetry data from the drone to the satellite after registering the satellite as the current controller for the drone.

* * * * *